(12) United States Patent  
Beringer et al.

(10) Patent No.: US 7,574,670 B2  
(45) Date of Patent: Aug. 11, 2009

(54) SYSTEMS AND METHODS FOR INTERFACING WITH A USER OF A COMPUTER SYSTEM

(75) Inventors: Joerg Beringer, Los Altos, CA (US); Michael Hatscher, Hamburg (DE)

(73) Assignee: SAP AG, Walldorf (DE)

( * ) Notice: Subject to any disclaimer, the term of this patent is extended or adjusted under 35 U.S.C. 154(b) by 556 days.

(21) Appl. No.: 11/119,809

(22) Filed: May 3, 2005

(65) Prior Publication Data

US 2005/0283738 A1 Dec. 22, 2005

(30) Foreign Application Priority Data

May 5, 2004 (EP) .................................. 04076360

(51) Int. Cl.
*G06F 3/00* (2006.01)
*G06F 3/14* (2006.01)

(52) U.S. Cl. ........................ 715/777; 715/765; 715/769; 715/781

(58) Field of Classification Search ................. 715/744, 715/762, 764, 765, 769, 777, 781, 810
See application file for complete search history.

(56) References Cited

U.S. PATENT DOCUMENTS

| | | | | |
|---|---|---|---|---|
| 5,305,435 A | * | 4/1994 | Bronson | ..................... 715/777 |
| 5,668,964 A | * | 9/1997 | Helsel et al. | ................. 715/776 |
| 5,745,718 A | * | 4/1998 | Cline et al. | ................... 715/777 |
| 6,166,736 A | * | 12/2000 | Hugh | ......................... 715/798 |
| 2002/0140736 A1 | * | 10/2002 | Chen | ............................ 345/777 |
| 2003/0197735 A1 | * | 10/2003 | Woltzen | ...................... 345/777 |
| 2003/0222916 A1 | * | 12/2003 | Kuwata et al. | .............. 345/777 |
| 2004/0113941 A1 | * | 6/2004 | Sliwa et al. | .................. 345/744 |
| 2004/0113948 A1 | * | 6/2004 | Shahrbabaki et al. | ........ 345/777 |
| 2006/0230356 A1 | * | 10/2006 | Sauve et al. | .................. 715/777 |

* cited by examiner

*Primary Examiner*—X. L Bautista  
(74) *Attorney, Agent, or Firm*—Finnegan, Henderson, Farabow, Garrett & Dunner LLC (57) ABSTRACT

Systems and methods are provided for interfacing with a user of a computer system. In one implementation, a method is provided that comprises providing a tabstrip controller to display different components of an application in a display, wherein in the display the components are displayed at once as a plurality of tabs in a tabstrip. Further, the method may include controlling the tabstrip to allow at least one tab to be removed from the tabstrip and, optionally, to be displayed in a separate display entity, e.g., a free-floating or docked window. Embodiments of the invention further relate to a user interface for interfacing a user with a computer system and to a computer system arranged to generate a user interface. Embodiments consistent with the invention also relate to a computer program product and an article of manufacture.

31 Claims, 5 Drawing Sheets

SYSTEMS AND METHODS FOR INTERFACING WITH A USER OF A COMPUTER SYSTEM

BACKGROUND

I. Technical Field

The present invention generally relates to systems and methods for interfacing with a user of a computer system, and to user interfaces for interfacing a user with a computer system. The invention further relates to computer systems and computer program products arranged to generate a user interface.

II. Background Information

A user interface allows a user to interact with a computer system. The interface controls a display for a user, and typically allows the user to interact with the system. A computer system is known which, when running a computer program, has a user-interface comprising a graphical program interface which is part of the running computer program. Such conventional user interfaces provide display elements, such as palettes, inspector windows, and tabstrips that allow a user to navigate in the computer system.

Conventional display elements, such as palettes and inspector windows suffer from one or more drawbacks. For example, they can only be switched on or off. Also, they cannot be created out of existing material. Further, conventional tabstrips are static elements which do not provide for any interactivity other than showing certain facets of given data.

In view of the foregoing, it is an object of the present invention to address one or more problems encountered with conventional display elements, such as tabstrips. Further, it is an object of the present invention to provide a tabstrip which offers improved interactivity.

SUMMARY

Consistent with embodiments of the present invention, methods are provided for interfacing with a user of a computer system. Such methods may include providing a tabstrip controller to display different components of an application in a display, wherein in the display the components are displayed at once as a plurality of tabs in a tabstrip. Further, these methods may include controlling the tabstrip to allow at least one tab to be removed from the tabstrip.

In this way, user control including navigation is improved, since the user is able to manipulate the tabstrip to allow selected data to be displayed in a preferred location. Further, user convenience is improved since the user is able to determine aspects of the displays format. Thus, user experience is further improved.

In one embodiment, by removing or "tearing off" tabs, the user is able to grab and drag tabs out of a tabstrip and, in a further embodiment, transform them into windows. In accordance with a further embodiment, the windows may be docked or floating in the display. This may support an ad-hoc personalization of a screen, in particular the screen content. Further, by removing a tab from the tabstrip data usually hidden from view to the user may be made visible for a user-determined duration.

According to another embodiment of the present invention, a user interface is provided for interfacing a user with a computer system. The user interface may comprise a tabstrip controller to display different components of an application in a display, wherein in the display the components are displayed at once as a plurality of tabs in a tabstrip. Further, the tabstrip controller may be arranged to allow at least one tab to be removed from the tabstrip.

According to a further embodiment of the present invention, there is provided a computer system comprising a processor device and a generating tool configured to run on the processor device for generating a user interface.

According to yet another embodiment of the invention, there is provided a computer program product comprising program code portions for performing a method for interfacing with a user of a computer system when running on a programmable apparatus.

According to still a further embodiment of the present invention, there is provided an article of manufacture with a computer usable medium having computer readable instructions therein for providing access to resources available on that computer, the computer readable instructions comprising instructions to cause the computer to perform a method for interfacing with a user of a computer system.

It is to be understood that both the foregoing general description and the following detailed description are exemplary and explanatory only, and should not be considered restrictive of the scope of the invention, as described and claimed. Further, features and/or variations may be provided in addition to those set forth herein. For example, embodiments of the invention may be directed to various combinations and sub-combinations of the features described in the detailed description.

BRIEF DESCRIPTION OF THE DRAWINGS

The accompanying drawings, which are incorporated in and constitute a part of this disclosure, illustrate various embodiments and aspects of the present invention. In the drawings.

DETAILED DESCRIPTION

The following detailed description refers to the accompanying drawings. Wherever possible, the same reference numbers are used in the drawings and the following description to refer to the same or similar parts. While several exemplary embodiments and features of the invention are described herein, modifications, adaptations and other implementations are possible, without departing from the spirit and scope of the invention. For example, substitutions, additions or modifications may be made to the components illustrated in the drawings, and the exemplary methods described herein may be modified by substituting, reordering or adding steps to the disclosed methods. Accordingly, the following detailed description does not limit the invention. Instead, the proper scope of the invention is defined by the appended claims.

Figure 1:
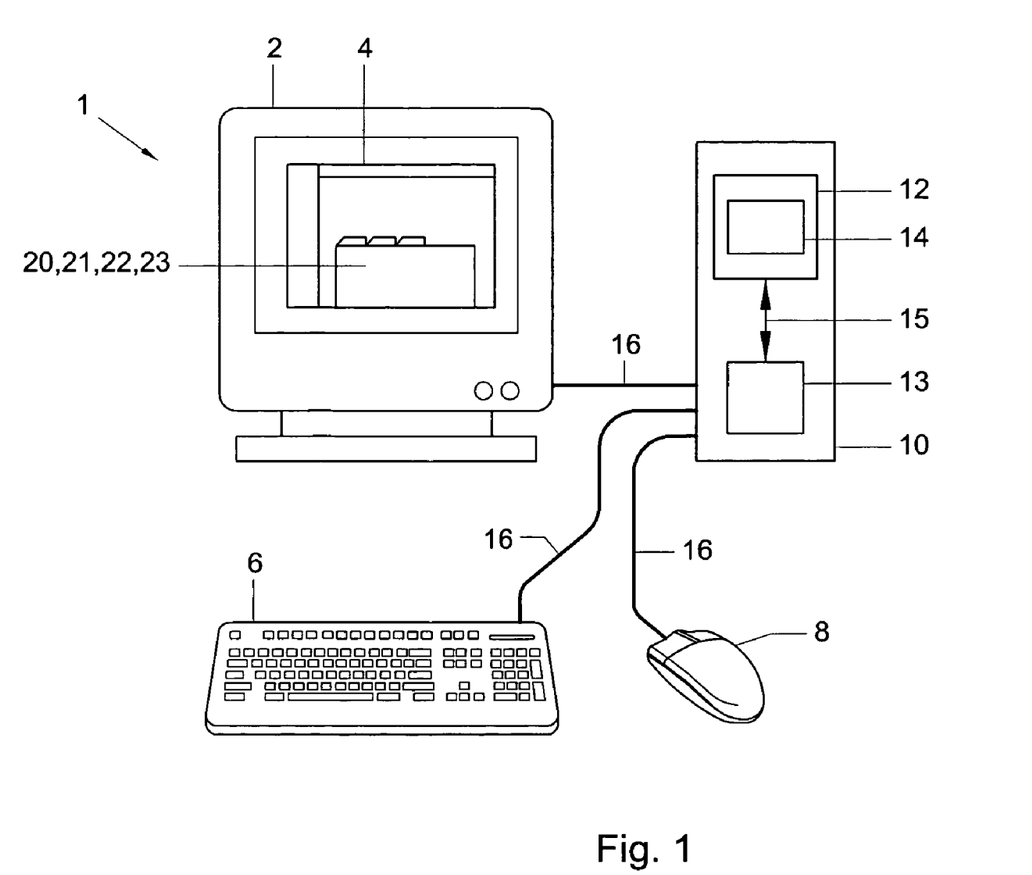
FIG. 1 schematically shows an exemplary computer system, consistent with an embodiment of the present invention.

FIG. 1 shows an exemplary computer system 1 that comprises a computer device 10. The computer system 1 may run an application or plurality of applications. The computer system 1 may further comprise a storage element 13 which may include, for example, at least one of a memory, a database and the like. If a memory and a database are provided, they may be provided in one device. Alternatively, their function may be distributed over various elements which may form part of the computer device 10 or may be remotely located. The storage element 13 may comprise data about activities, work items, invoices, receipts, etc. The data stored in the storage element 13 will depend on the application or applications that run on computer system 1. Each application may be stored in the computer system, for example, in the storage element 13. Alternatively, each application may be downloaded from a remote location, for example, via the Internet or other communication link.

As further shown in FIG. 1, a user interface 2, 4, 6, 8, 10 is provided to enable a user to interact with the computer system. In particular, the user interface 2, 4, 6, 8, 10 allows a user to interact with a particular application or applications. The user interface 2, 4, 6, 8, 10 may comprise components which allow the user to interact with the computer system. In one embodiment, the user interface may comprise a computer program. It may further comprise an input device or devices, such as a mouse 8 or a keyboard 6, and an output device, for example, a display screen 2, on which data forming an output in a human perceptible form, for example, in the form of a display 4, may be shown. In the example shown, the output is provided in a visual form. The display 2, 4 may also be referred to as a graphical user interface (GUI). Both the output interface 2, 4 and the input interface 6, 8 may comprise other components than those depicted in FIG. 1, such as, for example, an electronic writing pad, acoustic input devices or otherwise. Furthermore, the input and output interface may at least partially be integrated in the same device, such as in a touch screen or otherwise.

In order to allow signals input by a user to be communicated with computer device 10, a communication link 16 is provided. The computer device 10 may comprise a processor 12 arranged to process data and a storage element 13. The processor 12 may be arranged to run the application(s). In order to facilitate data exchange between the processor 12 and the storage element 13, a communication link 15 is provided across which data may be transmitted. The processor 12 is further arranged to generate the data associated with generating and maintaining the user interface 2, 4, 6, 8, 10. The processor 12 may include a tabstrip controller 14 for controlling a tabstrip 20, 21, 22, 23 displayed on the display 4. The tabstrip controller may include a computer program which, when run on the processor 12, causes the display to display a tabstrip. The tabstrip controller 14 is described in more detail below.

In order to allow a display to be shown on the display screen, a communication link 16 is provided between the computer device 10, in particular, the processor 12 and the display screen 2.

The processor 12 is arranged to handle input data, in the form of signals from the input interface, and output data at the display 2, 4. The processor 12 may further be provided with other functionality, such as the ability to handle data received or outputted to other devices, manipulate data, or as mentioned run one or more computer programs, for example, applications, stored in the memory 12 or otherwise.

In accordance with an embodiment, actions performed by a user by means of the keyboard 6 and mouse 8 are graphically represented at the GUI by the computer system 1. Thus, in this example, when actions are said to be performed by a user at the GUI, the actions performed by means of the keyboard 6 and mouse 8 are graphically represented at the GUI. However, it is also possible to combine the GUI and the input interface, for example, as a touch screen or otherwise. In such a case, actions said to be performed by the user at the GUI are both represented and performed at the GUI.

As shown in FIG. 1, the user interface 2, 4, 6, 8, 10 comprises a graphical display 4 with which the user interfaces, which is a visual representation on the display screen 2 of at least a part of a computer program running on the computer device 10. The computer program which generates the graphical display 4 may, for example, provide a user at a node in a computer network with access to resources on a server in the network. The computer program generating the graphical display 4 may, for example, provide a graphical representation of a web-browser program which allows access to resources, such as data, applications and services of a computerized enterprise management system.

A tabstrip 20 is a graphical element resembling a card index. A tabstrip may be used to display different components 21, 22, 23 of an application on a single display 4. In contrast to conventional display processing, the user may see all components 21, 22, 23 at once and navigate between them. A tabstrip 20 may comprise two or more page elements 21, 22, 23, wherein each page element 21, 22, 23 has a title element. Page elements may typically be implemented as subscreens, and title elements as pushbuttons. According to an embodiment of the invention, the user interface 2, 4, 6, 8, 10 interfacing a user with the computer system 1 may comprise a tabstrip controller 14 to display different components 21, 22, 23, of an application in a display 4, wherein in the display components 21, 22, 23 are displayed at once as a plurality of tabs 21, 22, 23 in a tabstrip 20, wherein the tabstrip controller 14 is arranged to allow at least one tab 21 to be removed from the tabstrip 20.

FIGS. 2-5 schematically show further embodiments of a graphical user interface suitable for use in the computer system shown in FIG. 1. In particular, FIGS. 2-5 show the output interface, for example, a display 4 on a display screen 2.

Figure 2:
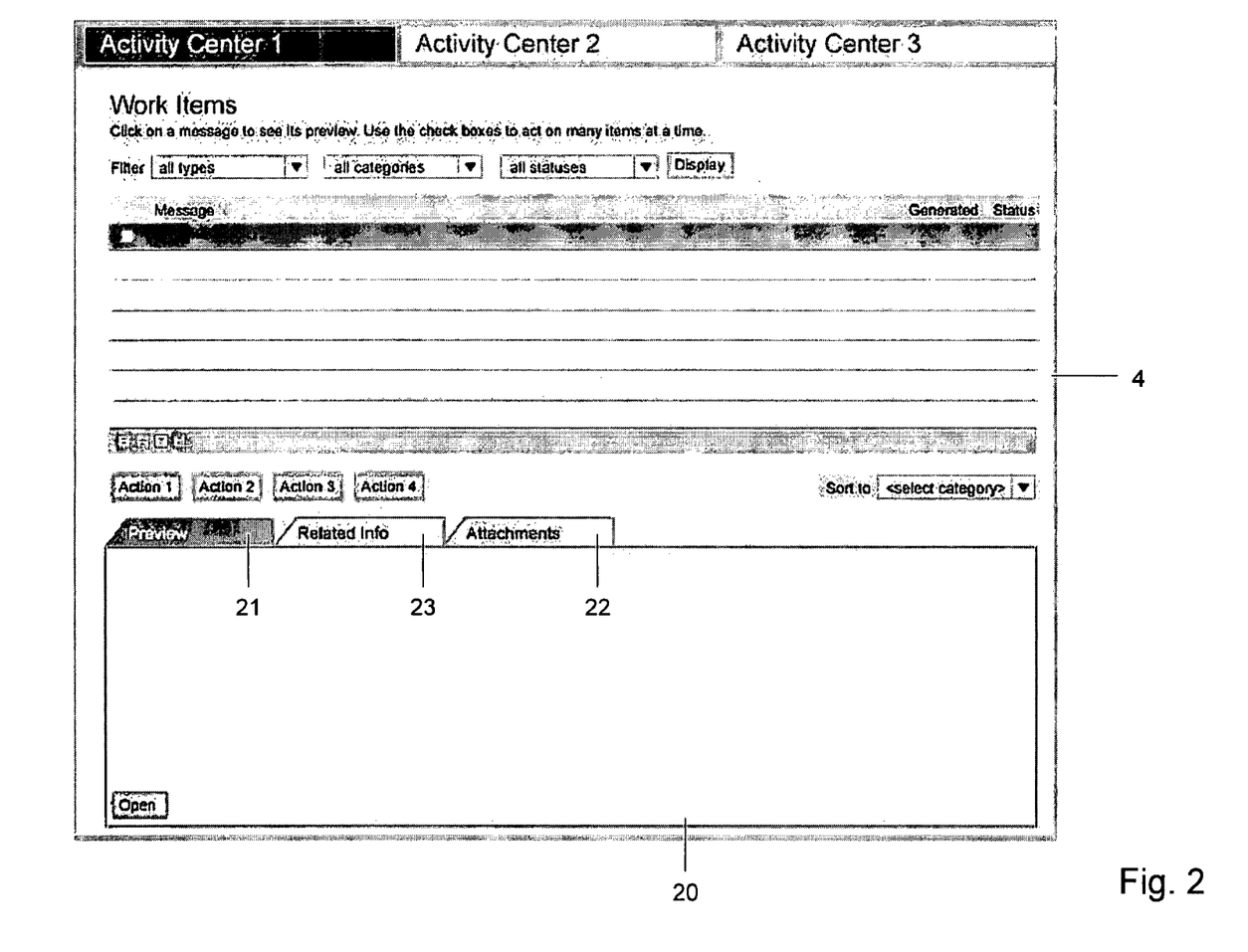
FIGS. 2-5 schematically show exemplary graphical user interfaces suitable for use in the computer system shown in FIG. 1, consistent with embodiments of the present invention.

FIG. 2 shows a tabstrip 20 comprising a "related info" tab 23, an "attachments" tab 22 and a "Preview" tab 21. On receipt of a signal from a user via the input interface 6, 8, the tabstrip controller 14 is arranged to "tear off" a selected tab. In a particular embodiment, the tabstrip controller 14 is arranged to remove at least one tab 21 in response to a signal 6, 8, 16 provided by the user. In this way, the user can create an ad-hoc personalization of the display 4 in accordance with his or her preferences. Further, each tab 21, 22, 23 in the tabstrip 20 is located at a respective location.

Figure 3:
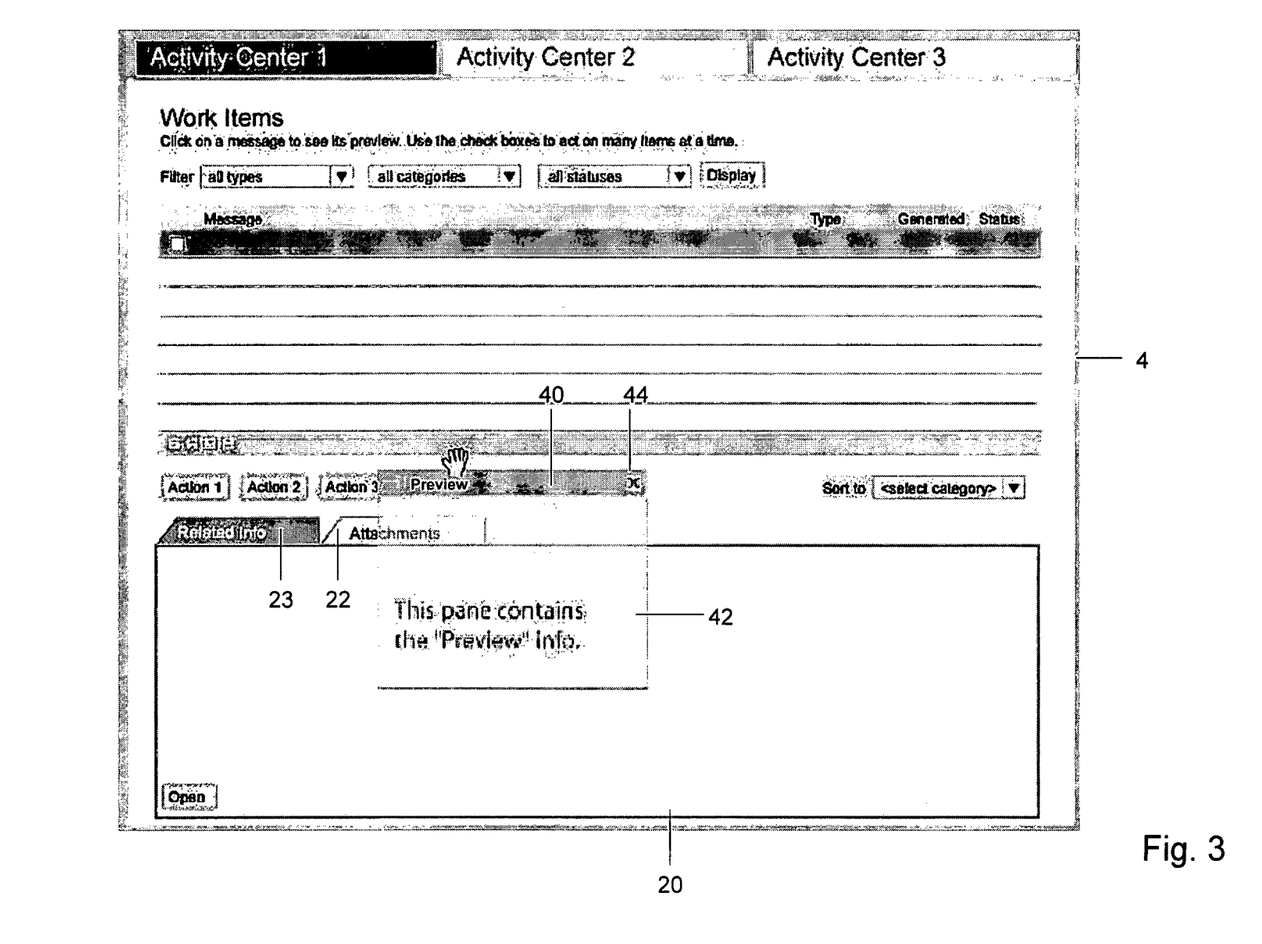

In FIG. 3, it is shown that in response to a user signal via the input interface, the tabstrip controller 14 is arranged to move the removed tab 21 at least partially away from the respective location. In this way, the lay-out of the display can be determined in accordance with a user's preference. In a further embodiment, the tabstrip controller is arranged to respond to a signal provided by the user to allow a user to grab and drag a tab out of the tabstrip. In this way, the tabstrip controller allows the tabstrip to be manipulated in a manner similar to other elements in an environment supporting direct manipulation. In a further embodiment, the display is arranged to display the at least one tab in a separate display entity 40, 50, 60, for example, a free floating window. In particular, the tabstrip controller is arranged to transform the tab removed from the tabstrip into a window 40 in response to a signal provided by the user. This allows information that is otherwise hidden in the tab to be displayed.

In FIG. 3 the torn-off tab 21 is transformed into a window 40. The window 40 may comprise a client window 42, also referred to as a pane, which contains the information associated with the tab. In FIG. 3, the "preview" tab 21 is torn off. In its place a preview window 40 is formed. The client window 42 contains the preview information. The bar 44 allows the user to perform actions with respect to the window 40, for example, to minimize, maximize or close the window 40.

Once the tab has been torn off, tabstrip controller 14, in response to a signal provided by the user via the input interface 6, 8, allows a user to put the window 40 at a preferred location in the display, for example, on one side. In particular, the tabstrip controller 14 is arranged to structure the window 40 so that the data associated with the tab 21 is displayed to the user in the window 40.

Figure 4:
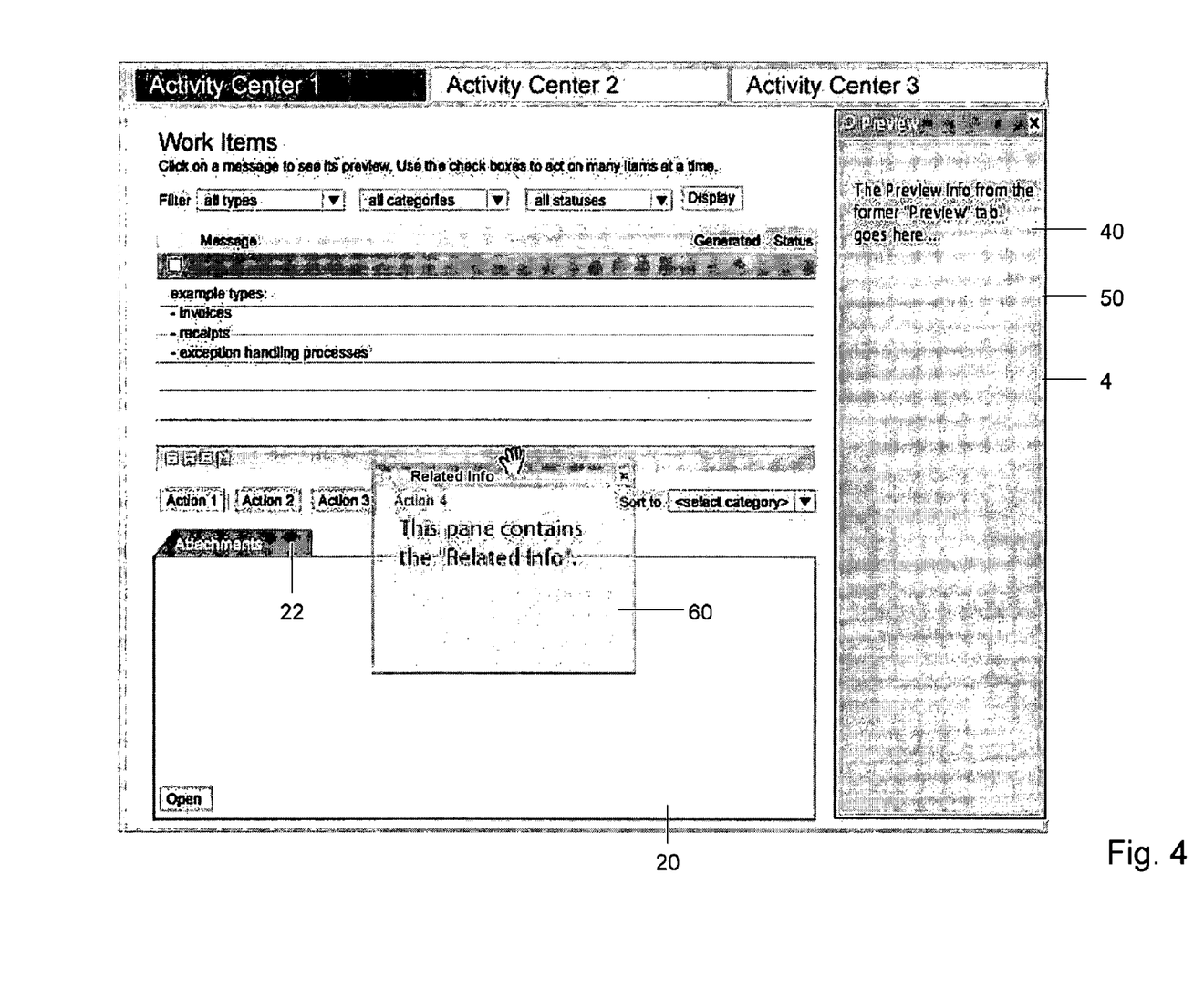

FIG. 4 shows a display 4 in which the preview tab 21 has been torn off and transformed into window 40. The tabstrip controller 14 is arranged to structure the display 4 so that the window 40 is docked at a predetermined location 50 in the display 4. Alternatively, the tabstrip controller 14 is arranged to structure the display 4 so that the window floats in the display 4. In a further embodiment, a further tab, the "related info" tab 22 is also torn off from the tabstrip 20. The tabstrip controller 14 is arranged to allow any number of the tabs to be torn off. For example, the tabstrip controller 14 is arranged to display the data associated with a plurality of tabs 21, 21 removed from the tabstrip 20 so that at any one time at least two windows are displayed. In this way, the information associated with any number of the tabs may be viewed at the same time, improving the user's awareness of the information content of the tabstrip which increases the user's ease of navigation. In a further embodiment, the predetermined location defines a docking area, and the display is arranged to rearrange to provide space in the display for the docking area. In this way, an improvement in the use of the available space in the display is achieved.

Figure 5:
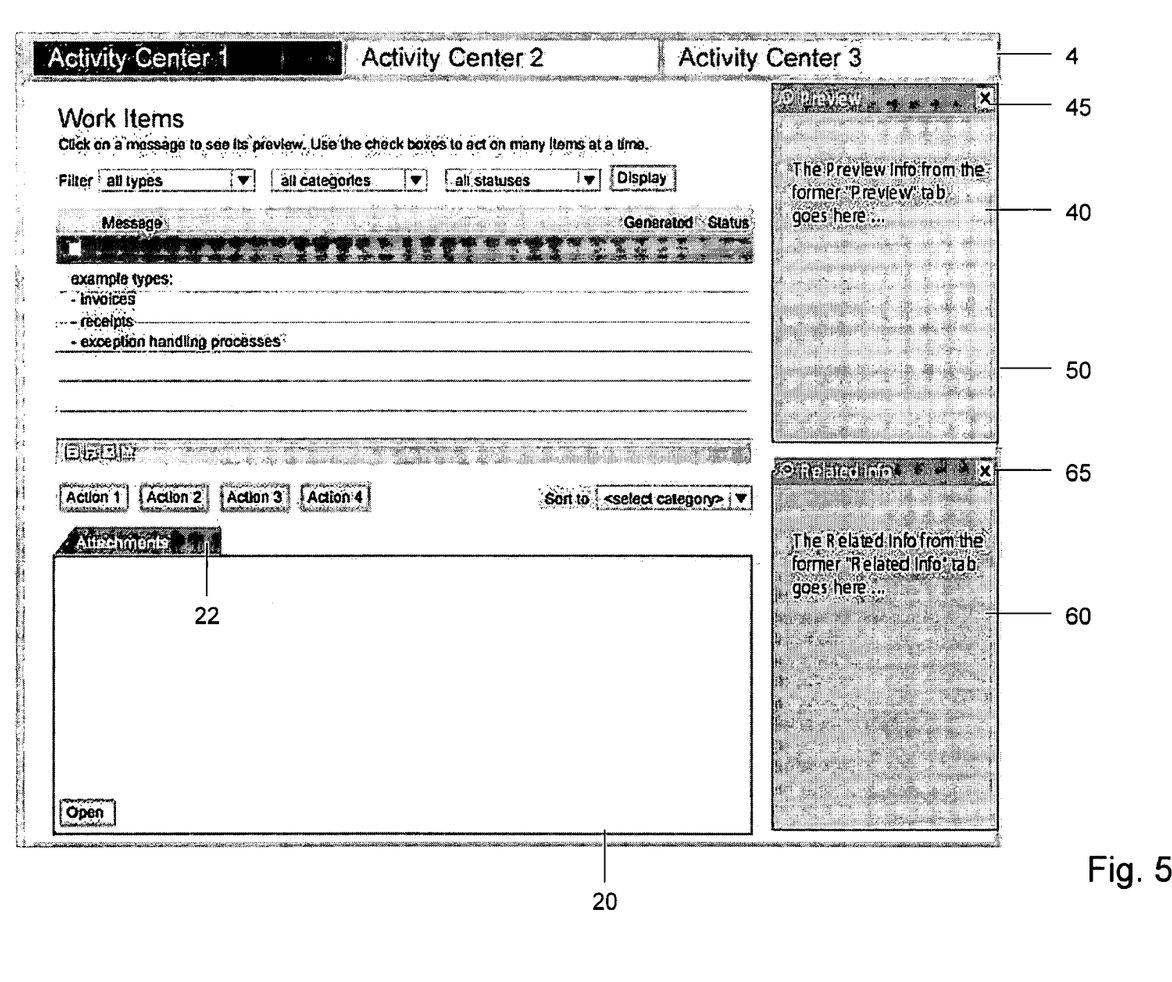

FIG. 5 shows that once the "related info" tab 22 has been torn off and transformed into a window 60, in response to a user signal, it may also be moved to the docking area 50. Once in the docking area 50, the size of the windows 40, 60 is adapted in order to fill the available space. In one embodiment, the available space is substantially equally distributed between the number of windows to be disposed in the docking area 50. Once docked in the docking area 50, the windows 40, 60 may be released by the user, for example, by releasing their respective pushpins 45, 65. In this way, the user is able to move the window back to where they came from. Alternatively, they may float freely.

In a further embodiment, the storage element 13 is arranged to store the display 4 when at least one tab 21 has been removed from the tabstrip 20. In this way, a user is able to store his or her personalized format as a preferred setting, so that in subsequent sessions, the display will provide the user's preferred arrangement, sparing the user the inconvenience of having to tear off the selected tabs another time. In a further embodiment, the storage element 13 is arranged to store the predetermined location 50 of the docked window 40, 60. In this way, over time the user becomes familiar with the format of the display, which further improves its convenience for the users. In one embodiment, the application is arranged to control the storage element. In a further embodiment, there is provided a computer system 1 comprising a processor device 12 and a generating tool 13, 14 configured to run on the processor device 12 for generating a user interface to the computer system 1.

According to a further embodiment of the present invention, there is provided a method of interfacing with a user in a computer system. The method may comprise: providing a tabstrip controller to display different components of an application in a display, wherein the components are displayed in the display at once as a plurality of tabs in a tabstrip, and controlling the tabstrip to allow at least one tab to be removed from the tabstrip. The method may include controlling the tabstrip to remove at least one tab in response to a signal provided by the user. In a further embodiment, each tab in the tabstrip is located at a respective location, and the method comprises: controlling the tabstrip to move the removed tab at least partially away from the respective location. The method may further include controlling the tabstrip to allow a user to grab and drag a tab out of the tabstrip in response to a signal provided by the user. In a further embodiment, the method includes controlling the tabstrip to transform the tab removed from the tabstrip into a window in response to a signal provided by a user. In a yet further embodiment, the method includes controlling the tabstrip to structure the window so that the data associated with the tab is displayed to the user in the window. In a yet further embodiment, the method includes controlling the tabstrip to structure the display so that the window is docked at a predetermined location in the display. The method may also include controlling the tabstrip to structure the display so that the window floats in the display. Further, the method may include storing the display once at least one tab has been removed from the tabstrip and yet further, storing the predetermined location of the docked window. In a yet further embodiment, the method includes controlling the tabstrip to display the data associated with a plurality of tabs removed from the tabstrip, so that at any one time at least two windows are displayed. The method may also include controlling the display to provide space in the display for the docking area.

The computational aspects described here can be implemented in digital electronic circuitry, or in computer hardware, firmware, software, or in any combinations thereof. Where appropriate, aspects of these systems and techniques can be implemented in a computer program product tangibly embodied in a machine-readable storage device for execution by a programmable processor, and method steps can be performed by a programmable processor executing a program of instructions to perform functions by operating on input data and generating output.

Embodiments of the invention may also be implemented in an article of manufacture with a computer-usable medium having computer-readable instructions embodied therein for providing access to resources available on that computer, the computer readable instructions comprising instructions to cause the computer to perform methods consistent with the invention. The invention may also be implemented as a computer program tangibly embodied in a computer-readable storage medium for running on a computer system, at least including code portions for performing methods according to the invention when run on a computer system or enabling a general purpose computer system to perform functions consistent with the invention. Such a computer program may be provided via a computer-readable storage medium, such as a CD-ROM diskette, stored with data loadable in a memory of a computer system the data representing the computer program.

It should be noted that the above-mentioned embodiments illustrate rather than limit the invention, and that those skilled in the art will be able to design alternatives without departing from the scope of the appended claims.

In the claims, any reference signs placed between parentheses shall not be construed as limiting the claim. The word 'comprising' does not exclude the presence of other elements or steps than those listed in a claim. The word 'a' is used as an equivalent of 'one or more' or 'at least one'.

While certain features and embodiments of the invention have been described, other embodiments of the invention will be apparent to those skilled in the art from consideration of the specification and practice of the embodiments of the invention disclosed herein. Further, the steps of the disclosed methods may be modified in any manner, including by reordering steps and/or inserting or deleting steps, without departing from the principles of the invention. It is intended, therefore, that the specification and examples be considered as exemplary only, with a true scope and spirit of the invention being indicated by the following claims and their full scope of equivalents.

What is claimed is:

1. A method for interfacing with a user of a computer system, comprising:
   providing a tabstrip controller to display different components of an application in a display, wherein in the display the components are displayed at once as a plurality of tabs in a tabstrip;
   controlling the tabstrip to allow at least one tab to be removed from the tabstrip; and
   displaying at least a portion of information contained in a removed tab, in a display entity created by each removed tab in the display, separate from the tabstrip,
   wherein available space in the display is automatically equally distributed between each created display entity.

2. A method according to claim 1, wherein the display entity is a free-floating window.

3. A method according to claim 1, further comprising:
   controlling the tabstrip to remove the at least one tab in response to a signal provided by the user.

4. A method according to claim 1, wherein each tab in the tabstrip is located at a respective location, and wherein the method further comprises controlling the tabstrip to allow a removed tab to be moved at least partially away from the respective location.

5. A method according to claim 1, further comprising:
   controlling the tabstrip to allow a user to grab and drag a tab out of the tabstrip in response to a signal provided by the user.

6. A method according to claim 1, further comprising:
   controlling the tabstrip to transform a tab removed from the tabstrip into a window in response to a signal provided by a user.

7. A method according to claim 6, further comprising:
   controlling the tabstrip to structure the window, so that the data associated with the tab is displayed to the user in the window.

8. A method according to claim 6, further comprising:
   controlling the tabstrip to structure the display so that the window is docked at a predetermined location in the display.

9. A method according to claim 8, wherein the predetermined location defines a docking area, and wherein the method comprises controlling the display to rearrange and provide space in the display for the docking area.

10. A method according to claim 6, further comprising:
    controlling the tabstrip to structure the display so that the window floats in the display.

11. A method according to claim 1, further comprising:
    storing the display once the at least one tab has been removed from the tabstrip.

12. A method according to claim 11, further comprising:
    storing the predetermined location of a docked window.

13. A method according to claim 12, further comprising:
    arranging the application to carry out at least one of the storing steps.

14. A method according to claim 1, further comprising:
    controlling the tabstrip to display the data associated with a plurality of tabs removed from the tabstrip, so that at any one time at least two windows are displayed.

15. A computer system having a user interface for interfacing a user with a computer system, comprising:
    a tabstrip controller to display different components of an application in a display, and
    a tabstrip displayed at once as a plurality of tabs,
    wherein:
       the tabstrip controller is arranged to allow at least one tab to be removed from the tabstrip, and
       the tabstrip controller allows display of at least a portion of information contained in a removed tab, in a display entity created by each removed tab, in the display, separate from the tabstrip,
       wherein available space in the display is automatically equally distributed between each created display entity.

16. The computer system according to claim 15, wherein the separate display entity is a free-floating window.

17. The computer system according to claim 15, wherein the tabstrip controller is arranged to remove the at least one tab in response to a signal provided by the user.

18. The computer system according to claim 15, wherein each tab in the tabstrip is located at a respective location, and further wherein the tabstrip controller is arranged to allow a removed tab to be moved at least partially away from the respective location.

19. The computer system according to claim 15, wherein the tabstrip controller is arranged to respond to a signal provided by the user to allow a user to grab and drag a tab out of the tabstrip.

20. The computer system according to claim 15, wherein the tabstrip controller is arranged to transform a tab removed from the tabstrip into a window in response to a signal provided by the user.

21. The computer system according to claim 15, wherein the tabstrip controller is arranged to structure the window so that the data associated with a tab is displayed to the user in the window.

22. The computer system according to claim 15, wherein the tabstrip controller is arranged to structure the display so that the window is docked at a predetermined location in the display.

23. The computer system according to claim 22, wherein the storage element is arranged to store the predetermined location of the docked window.

24. The computer system according to claim 23, wherein the application is arranged to control the storage element.

25. The computer system according to claim 22, wherein the predetermined location defines a docking area, and the display is arranged to rearrange to provide space in the display for the docking area.

26. The computer system according to claim 15, wherein the tabstrip controller is arranged to structure the display so that the window floats in the display.

27. The computer system according to claim 15, further comprising a storage element arranged to store the display once the at least one tab has been removed from the tabstrip.

28. The computer system according to claim 15, wherein the tabstrip controller is arranged to display the data associated with a plurality of tabs removed from the tabstrip so that at any one time at least two windows are displayed.

29. A computer system, comprising:
    a processor device; and
    a generating tool configured to run on the processor device for generating a user interface for the computer system, the user interface comprising a tabstrip controller to display different components of an application in a display, and
    a tabstrip displayed at once as a plurality of tabs,
    wherein the tabstrip controller is arranged to allow at least one tab to be removed from the tabstrip, and the tabstrip controller allows display of at least a portion of information contained in a removed tab, in a display entity created by each removed tab, in the display, separate from the tabstrip, wherein available space in the display is automatically equally distributed between each created display entity.

30. A computer program product tangibly embodied in a computer-readable storage medium, the storage medium comprising instructions which, when executed on a processor, cause the processor to perform a method for interfacing with a user of a computer system, the method comprising:

providing a tabstrip controller to display different components of an application in a display, and providing a tabstrip displayed at once as a plurality of tabs, wherein:

the tabstrip controller is arranged to allow at least one tab to be removed from the tabstrip, and the tabstrip controller allows display of at least a portion of information contained in a removed tab, in a display entity created by each removed tab, in the display, separate from the tabstrip, wherein available space in the display is automatically equally distributed between each created display entity.

31. A computer-readable storage medium containing instructions which when executed on a processor, cause the processor to perform a method for interfacing with a user of a computer system, the method comprising:

providing a tabstrip controller to display different components of an application in a display, and providing a tabstrip displayed at once as a plurality of tabs, wherein:

the tabstrip controller is arranged to allow at least one tab to be removed from the tabstrip, and the tabstrip controller allows display of at least a portion of information contained in a removed tab, in a display entity created by each removed tab, in the display, separate from the tabstrip, wherein available space in the display is automatically equally distributed between each created display entity.

* * * * *

UNITED STATES PATENT AND TRADEMARK OFFICE
CERTIFICATE OF CORRECTION

PATENT NO. : 7,574,670 B2  Page 1 of 1
APPLICATION NO. : 11/119809
DATED : August 11, 2009
INVENTOR(S) : Beringer et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 704 days.

Signed and Sealed this

Seventh Day of September, 2010

David J. Kappos
*Director of the United States Patent and Trademark Office*